(12) United States Patent
Koehler

(10) Patent No.: US 7,493,593 B2
(45) Date of Patent: Feb. 17, 2009

(54) METHOD FOR GENERATING A BUSINESS PROCESS EXECUTION LANGUAGE FOR WEB SERVICES EXECUTABLE WORKFLOW CODE FROM AN UNSTRUCTURED CYCLIC BUSINESS PROCESS MODEL

(75) Inventor: Jana Koehler, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 11/056,761

(22) Filed: Feb. 11, 2005

(65) Prior Publication Data

US 2005/0209993 A1 Sep. 22, 2005

(51) Int. Cl.
*G06F 9/44* (2006.01)
*G06F 17/30* (2006.01)

(52) U.S. Cl. .............................. 717/106; 717/105; 707/1
(58) Field of Classification Search ........................ None
See application file for complete search history.

(56) References Cited

U.S. PATENT DOCUMENTS 5,999,911 A * 12/1999 Berg et al. ...................... 705/9
2003/0004771 A1 * 1/2003 Yaung .............................. 705/8
2003/0208743 A1 * 11/2003 Chong et al. ................. 717/106
2005/0071243 A1 * 3/2005 Somasekaran et al. ......... 705/26
2005/0192783 A1 * 9/2005 Lystad et al. .................... 703/3

* cited by examiner

*Primary Examiner*—Tuan Q. Dam
*Assistant Examiner*—Isaac T Tecklu
(74) *Attorney, Agent, or Firm*—Gibb & Rahman, LLC

(57) ABSTRACT

A method for generating a BPEL4WS executable workflow code from an unstructured cyclic business process model. The method inputs a graphical representation of the business process model using a graphical modeling language. The graphical representation comprises activities, decisions and an unstructured cycle including more than one entry or more than one exit to an activity or a decision. The method assigns continuation semantics to the graphical representation which comprises partitioning the activities and the decisions of the graphical representation into the past, present, and future. The method assigns a continuation variable to a start and an end of the graphical representation and assigns a continuation variable to each activity and each decision that has more than one incoming link or more than one outgoing link.

8 Claims, 13 Drawing Sheets

METHOD FOR GENERATING A BUSINESS PROCESS EXECUTION LANGUAGE FOR WEB SERVICES EXECUTABLE WORKFLOW CODE FROM AN UNSTRUCTURED CYCLIC BUSINESS PROCESS MODEL

TECHNICAL FIELD

The present invention relates to a method for generating an executable workflow code from an unstructured cyclic process model, a method for executing a workflow code of an arbitrary process model, a workflow execution engine for process models with or without control cycles and a computer program element therefor. As language for the workflow code for example BPEL4WS (Business Process Execution Language for Web Services, can be used.

BACKGROUND OF THE INVENTION

Today, a graphical description of a business process can be drawn, but it can not be mapped directly to an executable implementation on a workflow engine unless the business process is heavily simplified.

There are two categories of graphical tools for modeling business processes.

Graphical tools of the first category allow a user to describe the process and the behaviors it is intended to show in a completely free manner by using the user's own graphical notation. In this case, the meaning of the symbols in the notation is known only to the user and not by the graphical tool. The user can use the graphical rendering of his notation in the tool to communicate the meaning to other users. But, the user cannot use the graphical rendering to generate workflow code that can be executed on some workflow engine. An example therefor is Microsoft Visio (TM of Microsoft Corp.).

Graphical tools of the second category allow a user to describe the process by using a fixed set of graphical symbols provided by the tool. Before the user can describe the process, he must learn the set of symbols and understand their intended meaning, which is captured in the tool. The graphical tool may also check the user's input whether it complies with modeling rules implemented in the tool. If the user complies with these rules, an executable workflow can be generated with the help of the tool. WBI Modeler in MQ Series Workflow mode (TM of IBM Corporation) is an example therefor.

It is a particular characteristic that tools of the second category allow the user not to describe process flows, using arbitrary graphs. Very often, the flow must be acyclic, i.e. it must not contain loops, when code is to be generated. For example the WBI Modeler allows so called GO TO connectors to implicitly describe cycles, but not in MQ Series Workflow mode. This limitation restricts the freedom of the business process modeler and enforces him to create models which correspond to the abilities of the tool, but not necessarily to the complex reality. From these simplified models, only simplified workflows can be generated, which is a major inhibitor to the adoption of workflow technology today.

SUMMARY OF THE INVENTION

The invention provides a method for generating a BPEL4WS executable workflow code from an unstructured cyclic business process model. The method inputs a graphical representation of the business process model using a graphical modeling language. The graphical representation comprises activities, decisions and an unstructured cycle including more than one entry or more than one exit to an activity or a decision. The method assigns continuation semantics to the graphical representation which comprises partitioning the activities and the decisions of the graphical representation into past, present, and future. The method assigns a continuation variable to a start and an end of the graphical representation and assigns a continuation variable to each activity and each decision that has more than one incoming link or more than one outgoing link.

The method encodes the continuation semantics of the graphical representation as a preliminary workflow code of a BPEL4WS process in a computational tree. The method links successive activities and their assianed continuation variables. The method encodes the linking as additions to the BPEL4WS process in the computational tree. For a decision that branches to first and a second activity, the method links the continuation variable assigned to the decision to the continuation variables assigned to the first and second activities. The method attributes a transition condition to each of the branches, and encodes the linking as additions to the BPEL4WS process in the computational tree. For a decision that branches to a third activity, which is not assigned a continuation variable, the method adds a BPEL4WS process that invokes and links the BPEL4WS process and invokes to a successive continuation variable.

The method normalizes cyclic links to form a non-cyclic graph of a BPEL4WS workflow code. The method corresponds to the preliminary workflow code. The normalizing comprises a link elimination to eliminate empty activities and redefine links that reference empty activities. A link merges to replace links to the same empty activity with a single link that recombines transition conditions of replaced links. The method introduces a "while" activity to eliminate links that create cycles. The method outputs the BPEL4WS workfiow code to a BPEL engine for execution.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

REFERENCE SIGNS

Figure 1:
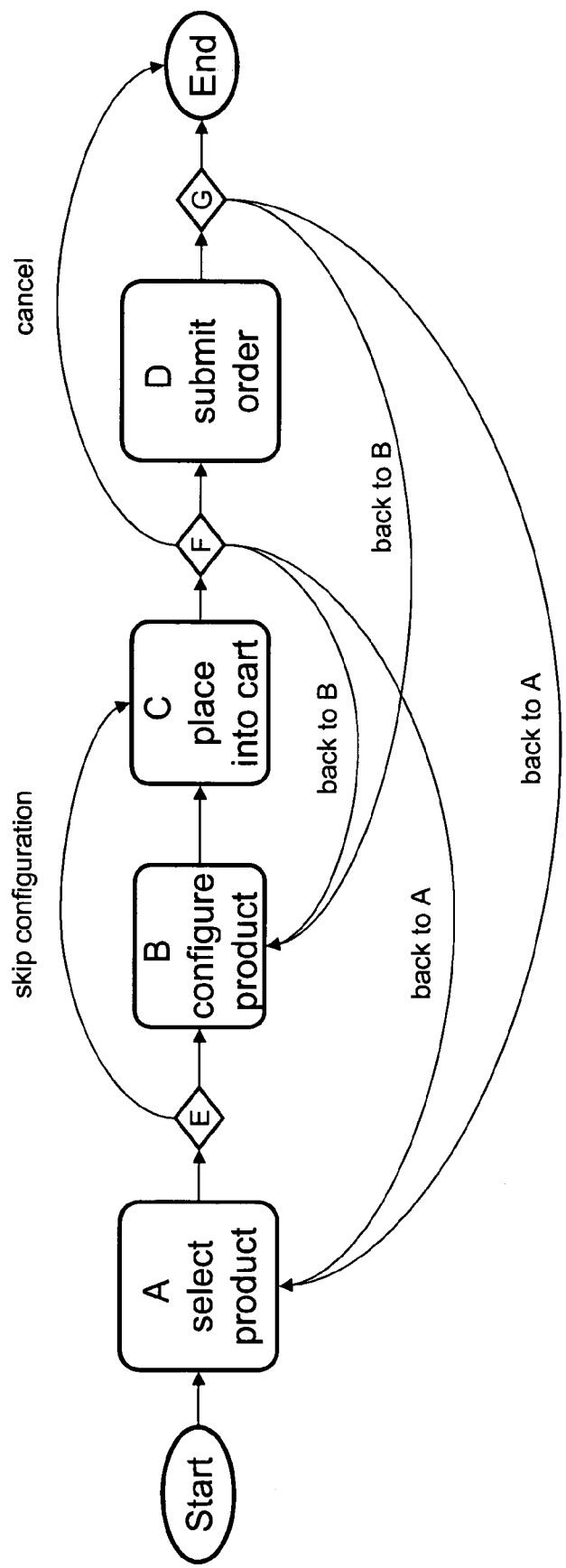
FIG. 1 an example of a graphical representation of a business process model.

To aid the understating of the description and the figures, the following reference signs are used.

x1-x8 continuation variables or empty activities
A-D activities
E, F, G conditions/decisions
Lx2 link between duplicated empty activities x2
Lx3 link between duplicated empty activities x3
Lx4.1, Lx4.2 links between duplicated empty activities x4
Lx5.1, Lx5.2 links between duplicated empty activities x5
1 variable memory
2 set of executable activities
3 extended workflow engine non-standard compliant workflow code
70 transformation engine
72 arbitrary process model
84 standard compliant workflow code
85 standard workflow engine

DETAILED DESCRIPTION OF THE DRAWINGS

The method according to the invention allows a user to use completely arbitrary cycles in the graphical rendering of a process model and map or compile the cyclic process model into optimized and executable workflow code. Therefore, in the method according to the invention a continuation semantics is associated with the graphical rendering which captures the intended control flow of the process model.

That the workflow engine can execute the process model or the continuation semantics respectively the process model/continuation semantics has to be transformed in an executable workflow code. In the following BPEL4WS (Business Process Execution Language for Web Services) is used as language to describe the executable workflow code, wherein BPEL4WS is only an example for such a language.

The BPEL4WS standard however stipulates that links must not create a control cycle.

Therefore, to meet the requirements of the BPEL standard a compilation method is described hereinafter in section "A. Normalizing cyclic links" which at first eliminates the control cycles in the cyclic process model and produces a functional equivalent BPEL4WS model which complies with the BPEL standard and which, when provided with the same input data as the original process model, provides also the same output data as the original process model including the cycles.

Furthermore, in section "B. Executing cyclic flows" an alternative method hereto is described which uses a modified version of the standard BPEL execution engine which is able to execute workflow models with control cycles caused by links.

1. Graphical Representation of the Business Process Model

FIG. 1 shows an example of a graphical representation of a business process model, wherein the business process model describes the possible flow of activities. This graphical representation uses well-defined elements from a graphical modeling language that was designed for business process modeling needs. Several different graphical modeling languages exist today to describe the process model. Well-known examples for these modeling languages are ARIS, WBI Modeler (IBM), and BPMN (Business Process Modeling Notation). The invention can be used for any of these modeling languages and others not mentioned here, but known to the expert. Which one is used depends on the technical boundary conditions.

Strictly speaking, FIG. 1 shows an example of an electronic purchasing business process adopting a BPMN-like notation. The business process describes how a user buys products via an online purchasing system.

The example process consists of four activities A, B, C, and D and three decisions E, F, and G. Once the process has started, activity A "select product" is executed. After the "select product" activity has been completed, the process branches at decision E. The user can either decide to configure the product executing activity B "configure product" or he places the product directly into the shopping cart using activity C "place into cart". After these activities have been completed, the user submits his order by executing activity D "submit order". This sequence of activities A, B, C and D describes the 'normal' purchasing process. For a successful implementation, however, this process should allow the user to freely navigate between the various activities. For example, after a product is placed into the cart, the user may want to revisit its configuration and perhaps change it. Furthermore, the user may want to select several products before he submits an order. After an order is submitted, the user may also want to revisit the configuration of the ordered product and/or change the set of selected products. Finally, a user may want to delay or cancel the placement of an order and leave the process without executing the activity D "submit order". This freedom in the process execution is described by the various back links, also called reentries, from the decisions F and G to one of the possible activities A or B. These back links generate cycles in the process model.

The example illustrates that arbitrary, unstructured cycles frequently occur in the graphical representation of business processes. Unstructured cycles are characterized by having more than one entry or exit point. The process shown in FIG. 1 contains such an unstructured cycle, which comprises the activities A, B, C, and D. This unstructured cycle can be entered at activity A by coming from either the start, the decision F, or the decision G. This unstructured cycle can also be entered at activity B by coming from the decisions F or G. It can be left via decision F, which allows the user to terminate a product selection and configuration process without placing an order, and decision G, which allows the user to terminate the purchasing process after his order is submitted. These multiple entry points (via A and B) and exit points (via F and G) are the characteristic features of unstructured cycles, which are sometimes also called wild or arbitrarily nested cycles. In contrast to unstructured cycles, a structured cycle has exactly one entry and one exit point, which is not shown in the example process of FIG. 1.

2. Assigning a Continuation Semantics to the Business Process Model

In order to make the business process model with unstructured cycles executable on a workflow engine, a continuation semantics is assigned to the graphical model. The continuation semantics partitions the graphical flow into the past, present, and future and allows it to describe the intended execution of a process model. For example, given the activity A, the activity A itself is considered as the present of the process, "Start" is considered as its past and the activities B or C are considered as its future. For a given node, which can be an activity or a decision, in the graphical flow (the present of the execution), its possible continuations (the remainder of the flow) can be described with the help of the continuation variables. This is done with the following method:

a) Assign a continuation variable to the start and end nodes.

b) Assign a continuation variable to each activity or decision node in the flow that has more than one incoming or outgoing link.

Figure 2:
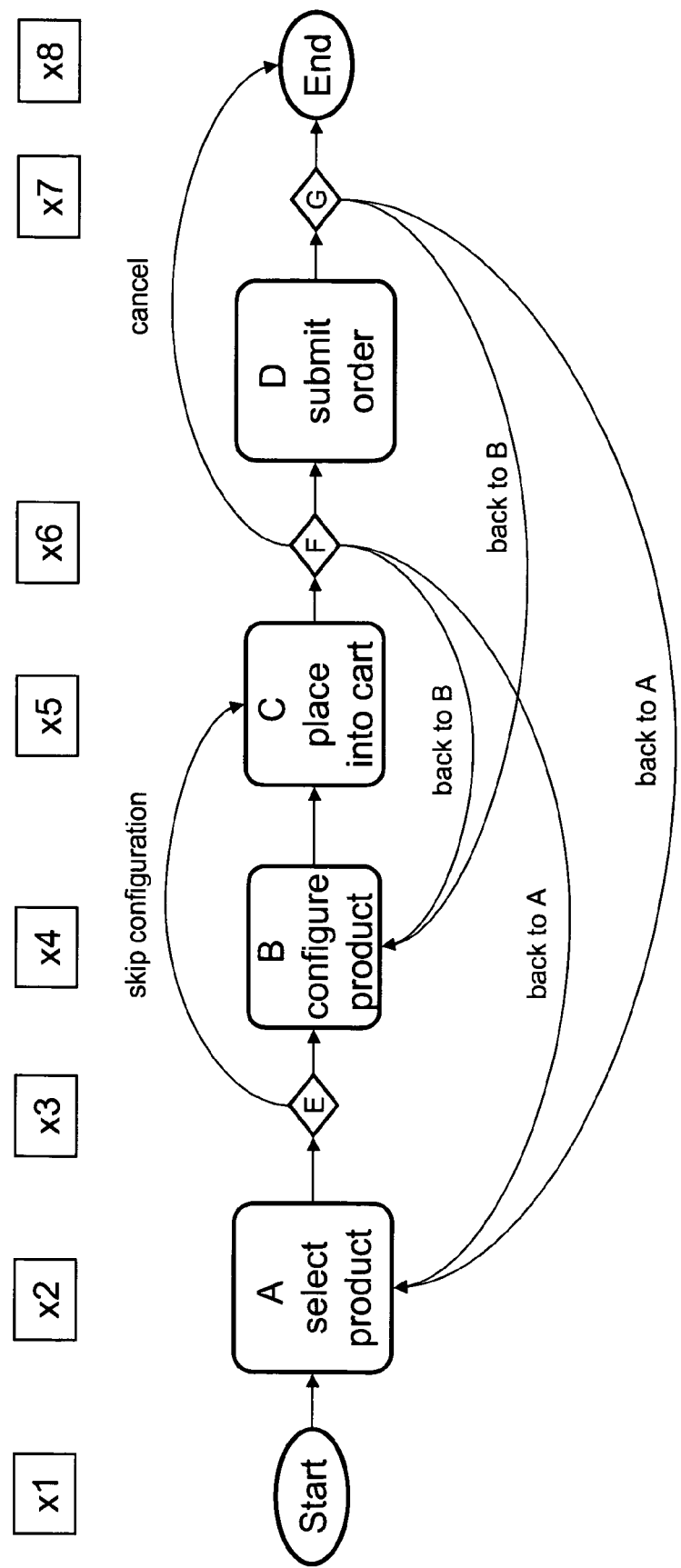
FIG. 2 the graphical representation of the business process model of FIG. 1 associated with continuation variables, FIG. 3 the computational trees, having the continuation variables as empty activities, encoded in BPEL, FIG. 3a the computational trees of FIG. 3 with duplicated empty activities, FIG. 4 a revised version of computational trees of FIG. 3a, FIG. 5 a revised version of a computational tree starting with empty activity x5, FIG. 6 a further revised version of the computational trees of FIG. 4, FIG. 7 a revised version of the computational trees of FIG. 6, FIG. 8 a revised version of the computational trees of FIG. 7, FIG. 9 a revised version of the computational trees of FIG. 8, FIG. 10 the final version of the computational trees, FIG. 11 a block diagram of the system architecture for generating and executing workflow code, and FIG. 12 a block diagram of an architecture with an extended workflow execution engine.

The assignment of the continuation variables according to the above mentioned rules a) and b) is depicted in FIG. 2.

Depending on which modeling language for the description of the graphical process model is used the mapping of the graphical representation of the business process model to the continuation semantics can be adapted to meet the graphical process model, also called input model, described under section 1 "Graphical representation of the business process model".

3. Encoding the Continuation Semantics of a Business Process Model in BPEL4WS

It should be noticed that it is possible to use the BPEL4WS language to encode the continuation semantics of any Turing-equivalent computation.

The encoding method builds a forest containing a computational tree for each continuation variable $x1$ to $x8$ and adds synchronizing links between the trees. This forest is represented as a BPEL4WS workflow. The example in FIG. 2 is used to explain how the forest is built:

3.1 A BPEL4WS process containing a flow element is generated.

```
<process>
    <flow>
    ....
    </flow>
</process>
```

3.2 For each continuation variable $x1$ to $x8$, the workflow starting in this continuation variable and ending at the next continuation variable is described. First, an empty activity having as name the name of the first continuation variable $x1$ is added to the flow.

```
<process>
    <flow>
        <empty name = "x1"/>
        ...
    </flow>
</process>
```

3.3 The continuation variable $x1$ is assigned to the "Start" activity, which is encoded as a BPEL4WS invoke activity. A link "x1-to-Sart" is added to the flow, which has the empty activity $x1$ as a source and the invoke activity "Start" as a target. The transition condition for this link is TRUE and therefore omitted from the definition.

```
<process>
    <flow>
        <links>
            <link name = "x1-to-Start"/>
        </links>
        <empty name = "x1">
            <source linkName = "x1-to-Start"/>
        </empty>
        <invoke name = "Start">
            <target linkName = "x1-to-Start"/>
```

-continued

```
        </invoke>
        ...
    </flow>
</process>
```

Figure 3:
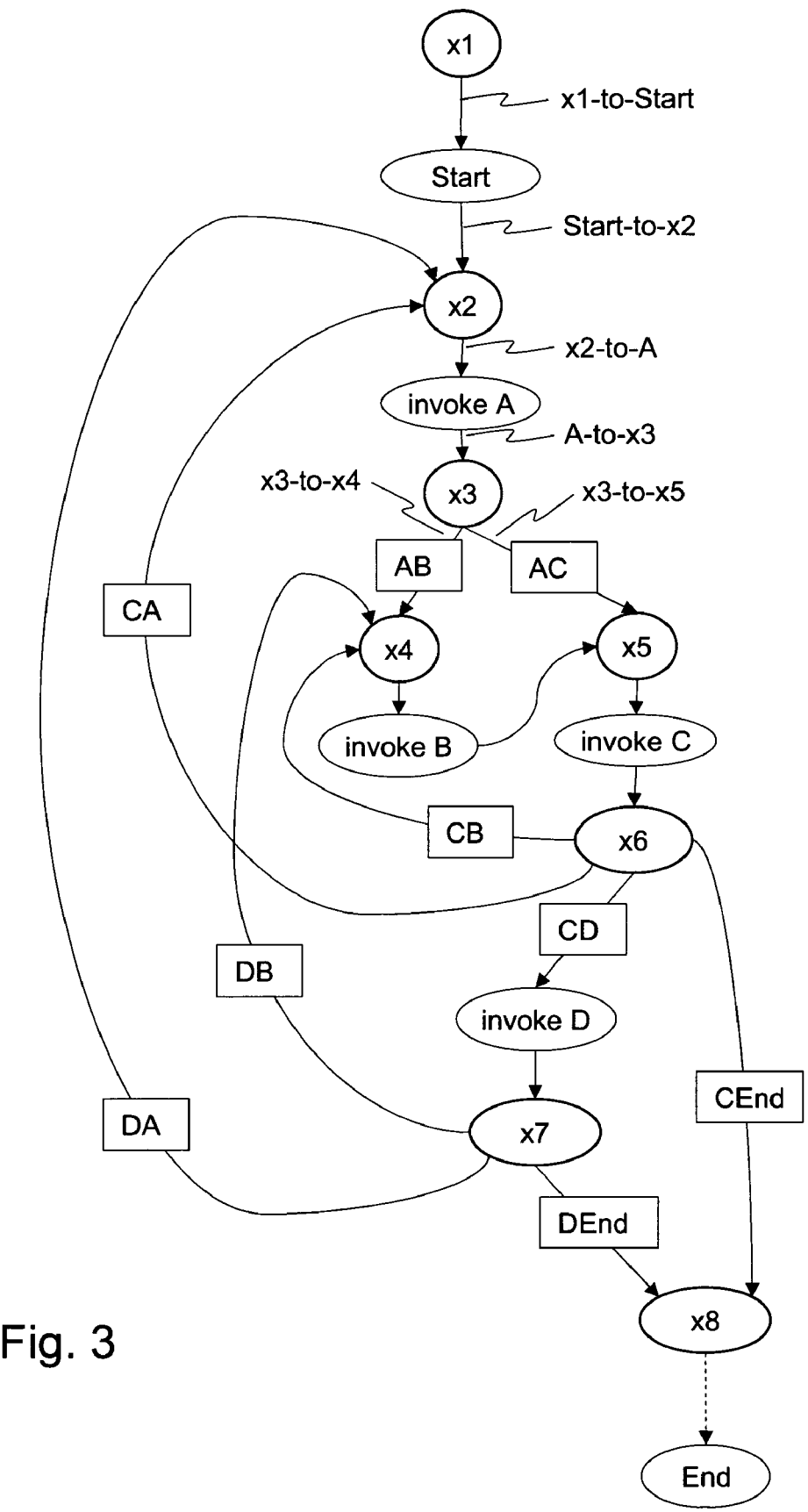

3.4 In FIG. 2 the "Start" activity is linked to the activity A "selectproduct", to which the continuation variable $x2$ was assigned. An empty activity $x2$ is added to the workflow, as shown in FIG. 3, and another link "Start-to-x2" is added, which has the "Start" activity as a source and the empty activity $x2$ as a target. The transition condition is TRUE and therefore omitted again. With this, the computational tree for the first continuation variable $x1$ is completed, because it ends in another continuation variable $x2$.

```
<process>
    <flow>
        <links>
            <link name = "x1-to-Start"/>
            <link name = "Start-to-x2"/>
        </links>
        <empty name = "x1">
            <source linkName = "x1-to-Start"/>
        </empty>
        <invoke name = "Start">
            <target linkName = "x1-to-Start"/>
            <source linkName = "Start-to-x2"/>
        </invoke>
        <empty name = "x2">
            <target linkName = "Start-to-x2"/>
        </empty>
        ...
    </flow>
</process>
```

3.5 Now, the computational tree for the continuation variable $x2$ is encoded and added to the BPEL4WS process. In the following, only the newly added elements are shown and the previous workflow code is not repeated. The continuation variable $x2$ was assigned to the activity A "select product", which is now added as another invoke activity. A link "x2-to-A", which has the empty activity $x2$ as a source and the invoke activity A "select product" as a target is also added. The activity A "select product" is linked in FIG. 2 to a decision node E, to which the continuation variable $x3$ was assigned. This continuation variable $x3$ is also encoded as an empty activity and a link "A-to-x3" from activity A "select product" to empty activity $x3$ is added. With this step, the computational tree for the continuation variable $x2$ is completed.

```
<empty name = "x2">
    <target linkName = "Start-to-x2"/>
    <source linkName = "x2-to-A"/>
</empty>
<invoke name = "A">
    <target linkName = "x2-to-A"/>
    <source linkName = "A-to-x3"/>
</invoke>
<empty name = "x3">
    <target = "A-to-x3"/>
</empty>
```

3.6 Now, the computational tree for the continuation variable $x3$ is encoded. This variable $x3$ points to a decision node E where the flow is branching. The branches from the decision node E point to the activities B "configure product" and C "place into cart" in the process model, which also have been assigned continuation variables x4 and x5. These variables x4 and x5 are added as new empty activities and the links "x3-to-x4" and "x3-to-x5" are defined accordingly. The value of the transition condition attribute of this source element is set to the conditional statement that can be derived from the process model if its graphical representation is annotated with branching conditions for the decision nodes. If not, as it is the case in the example of FIG. 2, abstract names can be used to represent these conditions. For example, the condition that drives the continuation from process activity A "select product" to process activity B "configure product" is denoted with AB, the condition to continue from activity A "select product" to activity C "place into cart", is denoted with AC.

```
<empty name = "x3">
    <target linkName = "A-to-x3"/>
    <source linkName = "x3-to-x4" transitionCondition= "AB"/>
    <source linkName = "x3-to-x5" transitionCondition= "AC"/>
</empty>
<empty name = "x4">
    <target linkName = "x3-to-x4"/>
</empty>
<empty name = "x5">
    <target linkName = "x3-to-x5"/>
</empty>
```

3.7 The computational trees for the continuation variables x4 and x5 are built in the same way as the trees for continuation variable x2 and therefore not repeated here. The computational tree for continuation variable x6 is more interesting. It also encodes a branching. One target of the branching is the activity D "submit order", which does not have a continuation variable assigned to it. Activity D "submit order" is added as another invoke activity and links to the continuation variable x7, which is also added to the computational tree in the form of the empty activity x7. Note that the continuation variable x6 contains links back to the empty activities x2 and x4.

For the purpose of a better description of the invention, these activities are duplicated in the flow. In an implementation of the invention, it would be common that no activities are duplicated.

```
<empty name = "x6">
    <target linkName = "C-to-x6"/>
    <source linkName = "x6-to-D" transitionCondition = "CD"/>
    <source linkName = "x6-to-x2" transitionCondition = "CA"/>
    <source linkName = "x6-to-x4" transitionCondition = "CB"/>
    <source linkName = "x6-to-x8" transitionCondition = "CEnd"/>
</empty>
<empty name = "x2">
    <target linkName = "x6-to-x2"/>
</empty>
<invoke name = "D">
    <target linkName = "x6-D"/>
    <source linkName = "D-to-x7"/>
</invoke>
<empty name = "x7">
    <target linkName = "D-to-x7"/>
</empty>
<empty name = "x4">
    <target linkName = "x6-to-x4"/>
</empty>
<empty name = "x8">
    <target linkName = "x6-to-x8"/>
</empty>
```

Figure 3A:
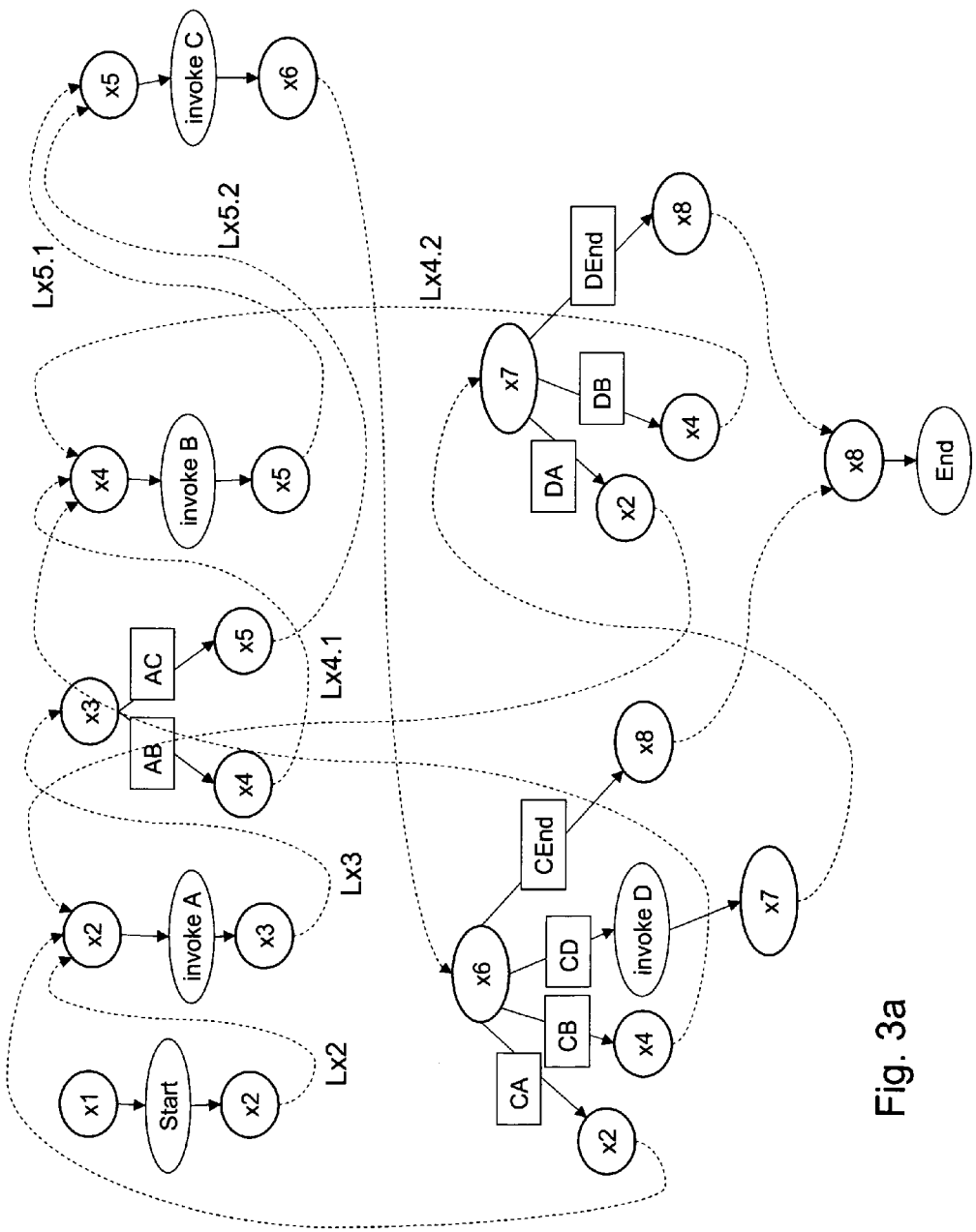

FIG. 3a shows the computational trees that are encoded in BPEL4WS. Each continuation variable x1 to x8 occurs as a root node of exactly one computational tree. All variables except x1, which encodes the entry into the flow, occur also in one or more leave nodes of the trees and their encoding empty activities have been duplicated one or more times to explain the invention. This multiplication of the empty activities in FIG. 3a illustrates that all trees describe sequential or branching flows only. Note that this duplication will not be made explicit in the BPEL4WS, which would normally not allow activities of the same name defined more than once. It has been done here to make the computational trees explicit and facilitate the description of the normalization method below. Because of the multiplied activities, additional links Lx2, Lx3, Lx4 . . . have been introduced in FIG. 3a to encode the synchronization between the duplicated empty activities in the different computational trees. These links Lx2, Lx3, Lx4 . . . are shown as dashed lines.

FIG. 3 shows the computational trees without duplicated empty activities as parts of the complete connected BPEL4WS flow graph that is built as described above. From this graph, the individual computational trees can be extracted.

The resulting BPEL4WS model could be almost given to a BPEL4WS engine for execution. However, it will often be the case that the model violates a major constraint of the BPEL specification, namely that the links must form a non-cyclic graph. As can be seen in FIG. 3 and 3a, the links between the multiple occurrences of empty activities introduce cycles. In order to execute such a BPEL4WS model, either a link normalization method must be provided, which makes the links acyclic or a modified execution method, which supports cyclic links must be provided. Both are defined in the following.

A. Normalizing Cyclic Links

The normalization method analyzes the computational trees and the links. It uses three techniques/rules to normalize cyclic links in a BPEL4WS workflow:

a) Link elimination: Link elimination eliminates empty activities and redefines all links that reference the empty activities.

b) Link merging: Link merging replaces links to the same empty activity with a new single link that recombines the transition conditions of the replaced links.

c) While-introduction: The while-introduction introduces a new while activity into the BPEL4WS workflow to eliminate links that create cycles.

The rules a)-c) are explained with the help of the example of FIG. 2, which is normalized in the following.

Step 1:

The goal of the normalization method is to remove all empty activities and any links that reference them. This can be achieved applying the link elimination technique, which is applied with highest priority. Whenever an empty activity only occurs once as the target of a link, it can be removed and the target of this link is set to those activities, which are the targets of links that start in the empty activity as their source. Below, the elimination of the empty activity x3 is shown, which is only a target of the link "A-to-x3". The empty activity x3 is the source of two links "x3-to-x4" and "x3-to-x5", which have the activities x4 and x5 as their target. These three links "A-to-x3", "x3-to-x4" and "x3-to-x5" are deleted and two new links "A-to-x4" and "A-to-x5" are created. A new link inherits the transition conditions of the links that it replaces, which are conjunctively joined. This means that the link "A-to-x4" inherits the condition "True & AB", which can be simplified to "AB", while the link "A-to-x5" inherits the condition "True & AC", which can be simplified to "AC".

Before link elimination and replacement, the flow has the following structure:

```
<flow>
    <empty name = "x2">
        <target linkName = "Start-to-x2"/>
        <source linkName = "x2-to-A"/>
    </empty>
    <invoke name = "A">
        <target linkName = "x2-to-A"/>
        <source linkName = "A-to-x3"/>
    </invoke>
    <empty name = "x3">
        <target linkName = "A-to-x3"/>
        <source linkName = "x3-to-x4" transitionCondition = "AB"/>
        <source linkName = "x3-to-x5" transitionCondition = "AC"/>
    </empty>
        <empty name = "x4">
        <target linkName = "x3-to-x4"/>
    </empty>
    <empty name = "x5">
        <target linkName = "x3-to-x5"/>
    </empty>
</flow>
```

After link elimination and replacement, the flow has the following structure:

```
<flow>
    <empty name = "x2">
        <target linkName = "Start-to-x2"/>
        <source linkName = "x2-to-A"/>
    </empty>
    <invoke name = "A">
        <target linkName = "x2-to-A"/>
        <source linkName = "A-to-x4" transitionCondition = "AB"/>
        <source linkName = "A-to-x5" transitionCondition = "AC"/>
    </invoke>
    <empty name = "x4">
        <target linkName = "A-to-x4"/>
    </empty>
    <empty name = "x5">
        <target linkName = "A-to-x5"/>
    </empty>
</flow>
```

With the same technique, the empty activities x6 and x7 are eliminated. The flow, which starts with the empty activity x5 becomes:

```
<flow>
    <empty name = "x5">
        <source linkName = "x5-to-C"/>
    </empty>
    <invoke name = "C">
        <target linkName = "x5-to-C"/>
        <source linkName = "C-to-D" transitionCondition = "CD"/>
        <source linkName = "C-to-x2" transitionCondition = "CA"/>
        <source linkName = "C-to-x4" transitionCondition = "CB"/>
        <source linkName = "C-to-x8" transitionCondition = "CEnd"/>
    </invoke>
    <empty name = "x2">
        <target linkName = "C-to-x2"/>
    </empty>
    <empty name = "x4">
        <target linkName = "C-to-x4"/>
    </empty>
    <empty name = "x8">
        <target linkName = "C-to-x8"/>
    </empty>
    <invoke name = "D">
        <target linkName = "C-to-D"/>
        <source linkName = "D-to-x2" transitionCondition = "DA"/>
        <source linkName = "D-to-x4" transitionCondition = "DB"/>
        <source linkName = "D-to-x8" transitionCondition = "DEnd"/>
    </invoke>
    <empty name = "x2">
        <target linkName = "D-to-x2"/>
    </empty>
    <empty name = "x4">
        <target linkName = "D-to-x4"/>
    </empty>
    <empty name = "x8">
        <target linkName = "D-to-x8"/>
    </empty>
</flow>
```

Figure 4:
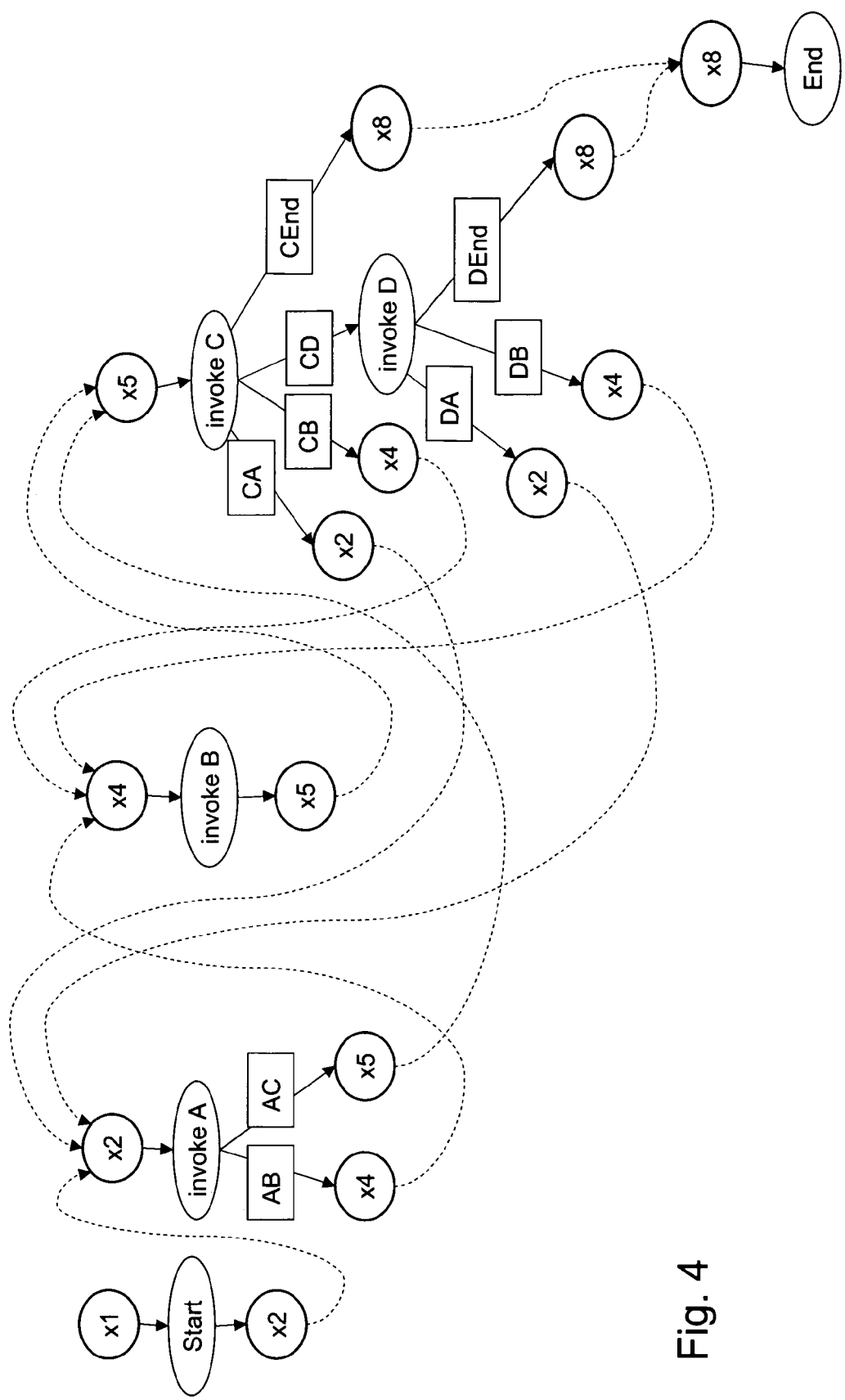

FIG. 4 illustrates the resulting computational trees after the first normalization step.

Step 2:

The computational tree starting in empty activity x5 contains several occurrences of the same empty activities x2, x4, and x8, which make alternative paths to the same activity explicit. By disjunctively combining the transition conditions from the links, which build these paths, the multiple occurrences of empty activities are eliminated and the alternative paths are rejoined into a single path. The resulting workflow code is described in the following:

```
<flow>
    <empty name = "x5">
        <source linkName = "x5-to-C"/>
    </empty>
    <invoke name = "C">
        <target linkName = "x5-to-C"/>
        <source linkName = "C-to-D" transitionCondition = "CD"/>
        <source linkName = "C-to-x2" transitionCondition = "CA or (CD & DA)"/>
        <source linkName = "C-to-x4" transitionCondition = "CB or (CD & DB)"/>
        <source linkName = "C-to-x8" transitionCondition= "CEnd or (CD & DEnd)"/>
    </invoke>
    <empty name = "x2">
        <target linkName = "C-to-x2"/>
    </empty>
    <empty name = "x4">
        <target linkName = "C-to-x4"/>
    </empty>
    <empty name = "x8">
        <target linkName = "C-to-x8"/>
    </empty>
    <invoke name = "D">
        <target linkName = "C-to-D"/>
    </invoke>
</flow>
```

Figure 5:
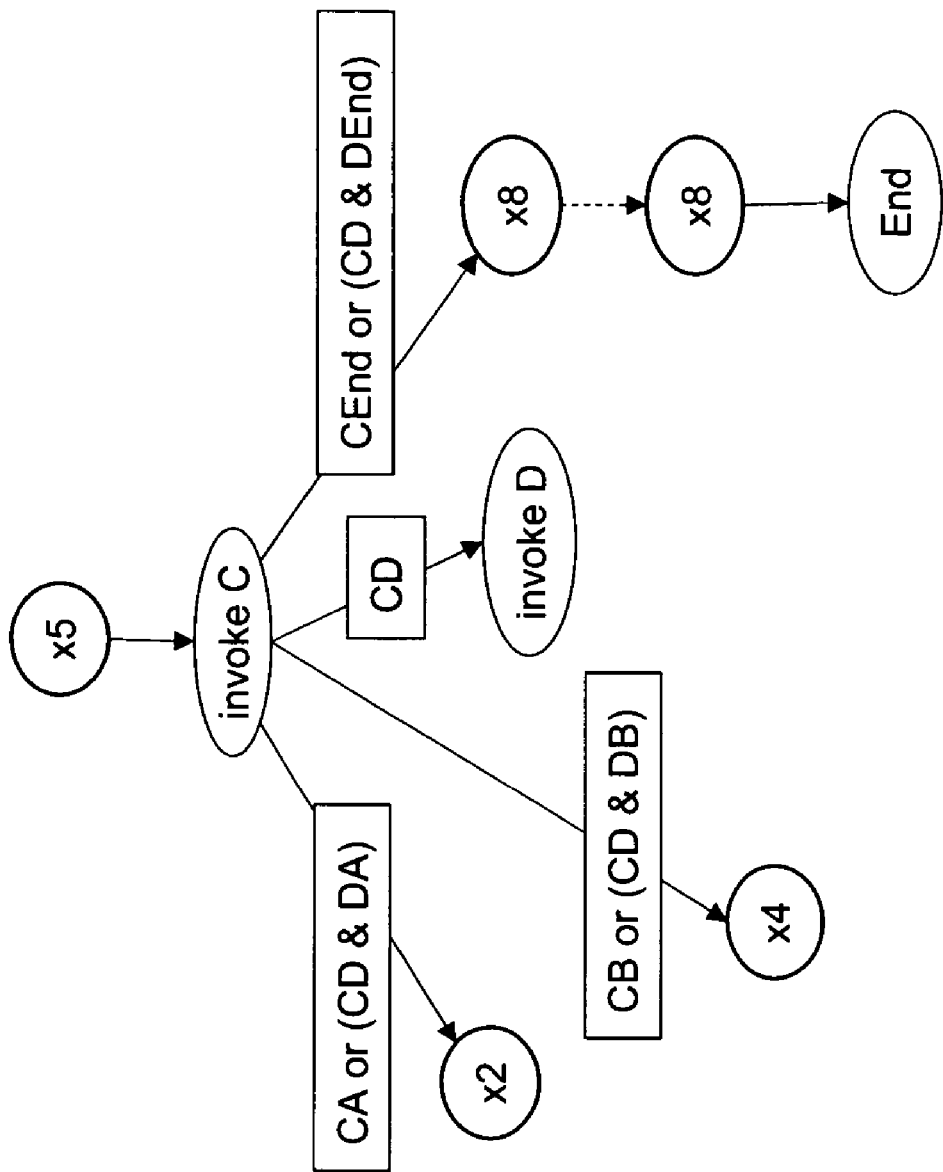

FIG. 5 illustrates the resulting simplification for the computational tree starting in x5.

Figure 6:
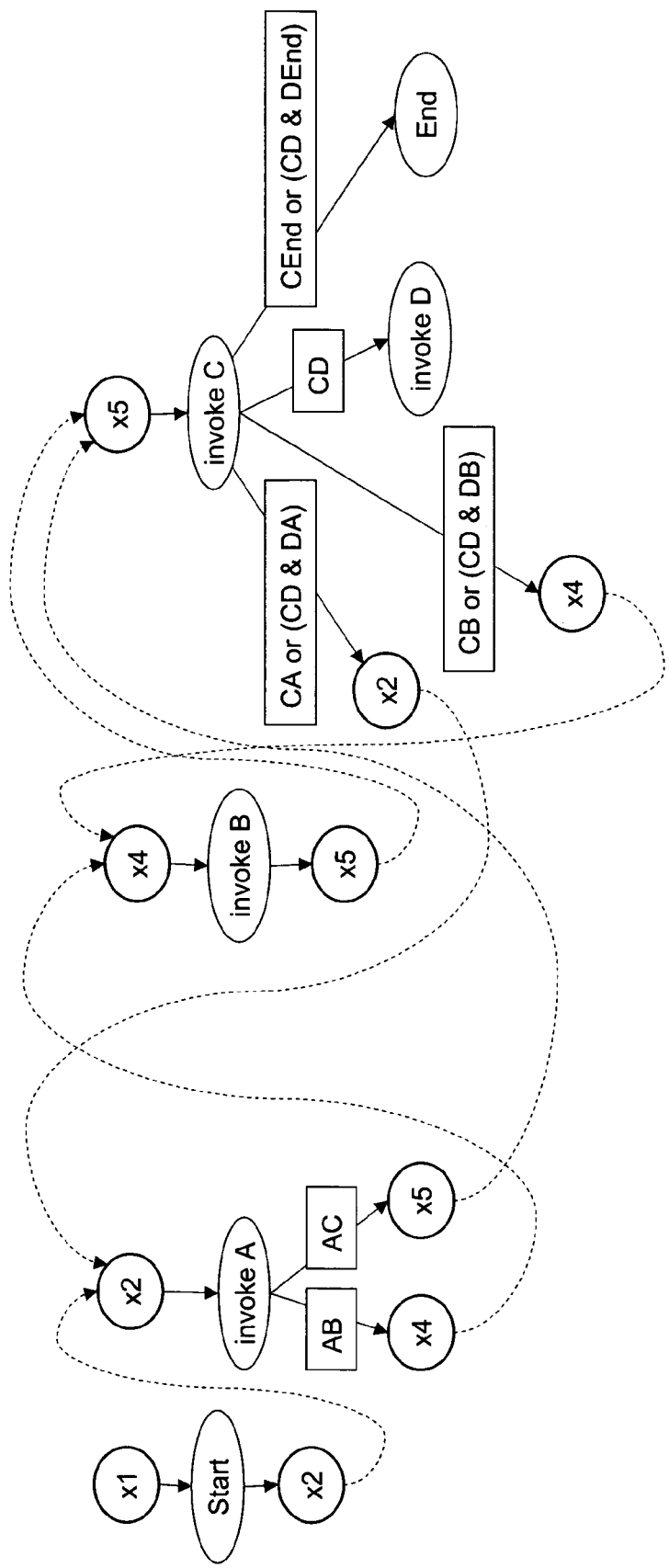
Figure 7:
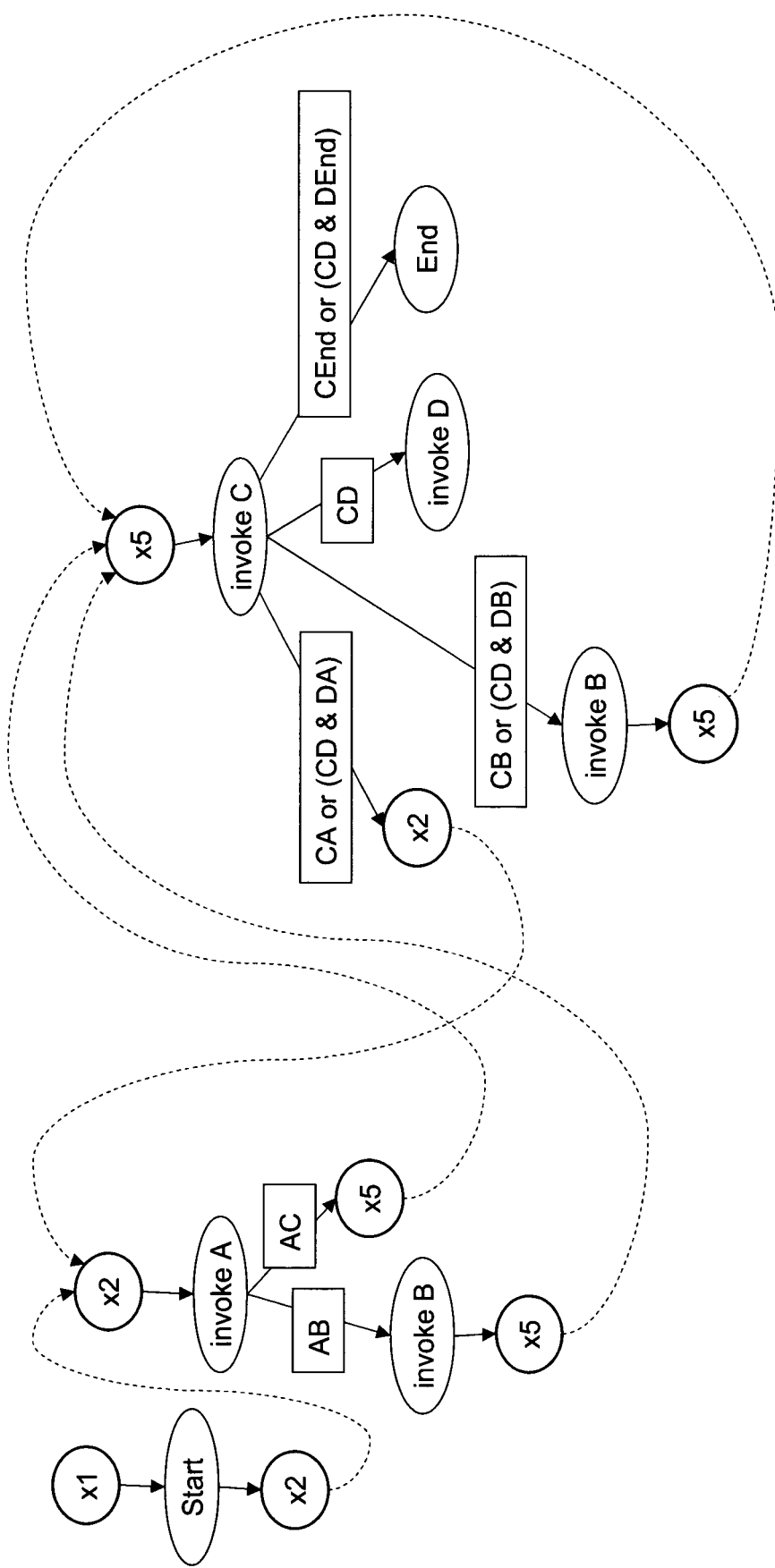

Step 3:

The empty activity x8 can now be eliminated by applying the link elimination technique, because it is the target of only a single link. FIG. 6 shows the remaining computational trees after all these normalization steps have been executed. The only remaining empty activities are x2, x4, and x5, wherein each is the target of two links. In order to further eliminate an empty activity, the computational tree of this activity has to be duplicated, because it is referenced from two different other activities. Otherwise, the link could not be eliminated. It makes sense to duplicate the computational tree for x4, because it is the smallest tree, consisting only of one invoke B activity and the empty activities x4 and x5. FIG. 7 illustrates the result of this duplication and the subsequent link eliminations. It can be seen that the computational tree for x5 contains the empty activity x5 again, which links back to the root of this tree. The BPEL4WS description is shown below. It contains a cycle formed by the links "x5-to-C", "C-to-B", and "B-to-x5". The workflow code becomes:

```
<flow>
    <empty name = "x5">
        <source linkName = "x5-to-C"/>
        <target linkName = "B-to-x5"/>
    </empty>
    <invoke name = "C">
        <target linkName = "x5-to-C"/>
        <source linkName = "C-to-D" transitionCondition = "CD"/>
        <source linkName = "C-to-x2" transitionCondition = "CA or (CD & DA)"/>
        <source linkName = "C-to-B" transitionCondition = "CB or (CD & DB)"/>
        <source linkName = "C-to-End" transitionCondition = "CEnd or (CD & DEnd)"/>
    </invoke>
    <invoke name = "B">
        <target linkName = "C-to-B"/>
        <source linkName = "B-to-x5"/>
    </invoke>
    <invoke name = "D">
        <target linkName = "C-to-D"/>
    </invoke>
    <invoke name = "End">
        <target linkName = "C-to-End"/>
    </invoke>
    <empty name = "x2">
        <target linkName = "C-to-x2"/>
    </empty>
</flow>
```

Step 4:

A while activity is introduced to eliminate the cycle formed by the three links. The condition for the while activity is taken from the transition condition of the link leading to the activity B, which is the source of the link back to x5. The resulting BPEL4WS code is shown below.

```
<flow>
    <empty name = "x5">
        <source linkName = "x5-to-assign1"/>
    </empty>
    <assign cond2 = "true">
        <source linkName = "assign1-to-while"/>
        <target linkName = "x5-to-assign1"/>
    </assign>
    <while condition = cond2>
        <source linkName = "while-to-x2" transitionCondition = "CA or (CD & DA)"/>
        <source linkName = "while-to-End" transitionCondition = "CEnd or (CD & DEnd)"/>
        <flow>
            <assign cond2 = "CB or (CD & DB)">
                <source linkName = "assign2-to-C"/>
            </assign>
            <invoke name = "C">
                <target linkName = "assign2-to-C"/>
                <source linkName = "C-to-D" transitionCondition = "CD"/>
                <source linkName = "C-to-B" transitionCondition = "CB or (CD & DB)"/>
            </invoke>
            <invoke name = "B">
                <target linkName = "C-to-B"/>
            </invoke>
            <invoke name = "D">
                <target linkName = "C-to-D"/>
            </invoke>
        </flow>
    </while>
    <invoke name = "End">
        <target linkName = "while-to-End"/>
    </invoke>
    <empty name = "x2">
        <target linkName = "while-to-x2"/>
    </empty>
</flow>
```

Figure 8:
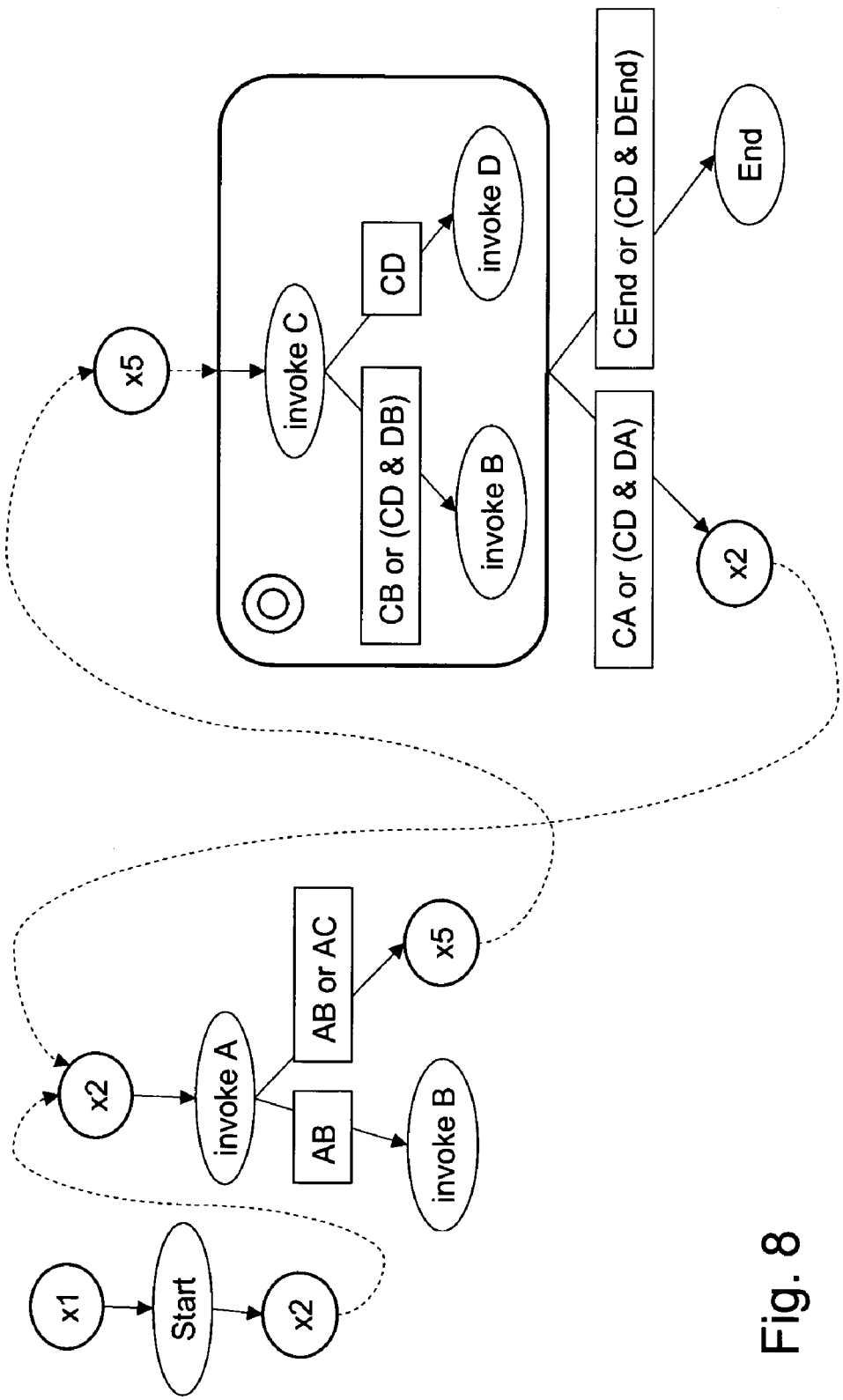
Figure 9:
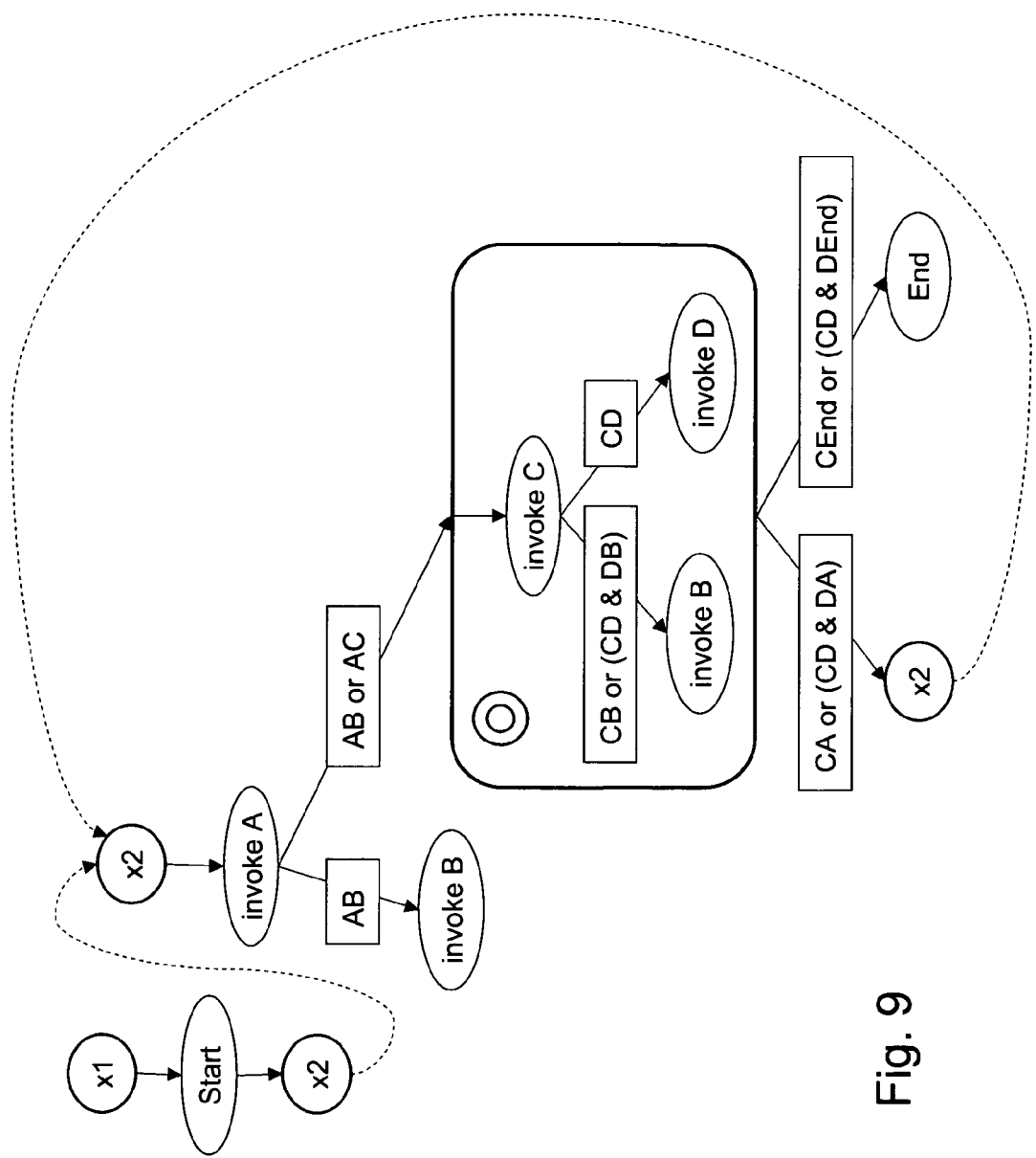

Step 5:

FIG. 8 shows the resulting simplified computational tree for empty activity x5 and the simplified tree for empty activity x2 after the rule b) link merging has been applied to join the multiple links to empty activity x5. In the next normalization step, the empty activity x5 can be eliminated. The result is shown in FIG. 9. It can be seen that the computational tree for empty activity x2 contains a reference back to empty activity x2 again, i.e. another while activity must be introduced in order to eliminate this cyclic link. The condition for the while loop is obtained by joining the conditions along the links, which lead to the empty activity x2. After the loop is introduced, the rule a) link elimination can be applied again to eliminate the empty activity x2. The empty activity x1 can also be removed, because it is not a target of any link and it is only the source of a single link to the invoke "Start" activity, which is the unique entry into the workflow. Even the "Start" and "End" activities can be omitted if they do not perform any process-relevant data processing, but have only been used in the graphical business process model to illustrate the start and the end of the process.

Figure 10:
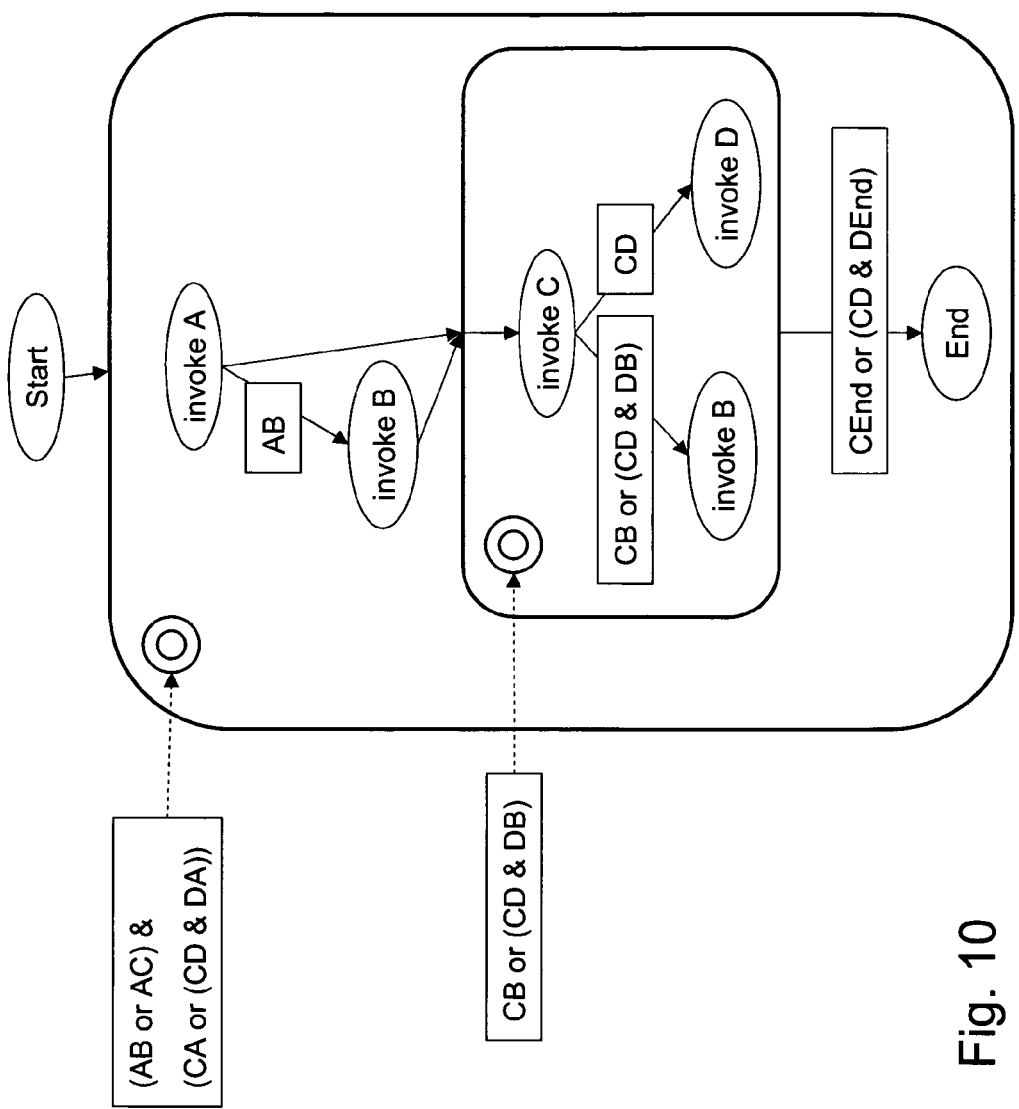

The resulting computational tree embedded into the two while loops is shown in FIG. 10. The resulting BPEL4WS workflow code is shown below using an alternative representation of the workflow. It takes advantage of the structured programming-language constructs that are available in BPEL4WS. Instead of defining a flow of activities and many links between them, activities that define an unconditional linear sequence of execution have been put into a sequence activity to reduce the number of links. Links with transition conditions have been replaced by equivalent switch activities. Names, link and variable declarations have been omitted to make the resulting control flow better visible. This alternative, equivalent representation is possible, because the link normalization method has eliminated all cyclic links from the original BPEL4WS example. It therefore corresponds to requirements of the BPEL4WS standard.

```
<process>
    <sequence>
        <assign cond1 = "true"/>
        <while condition = "cond1">
            <sequence>
                <assign cond1 = "(AB or AC) & (CA or (CD & DA))"/>
                <invoke name= "A"/>
                <switch>
```

```
            <case condition = "AB">
                <invoke name= "B"/>
            </case>
        </switch>
        <assign cond2 = "true"/>
        <while condition= "cond2">
            <sequence>
                <assign cond2 = "((CD & DB) or CB)"/>
                <invoke name= "C"/>
                <switch>
                    <case condition = "CD">
                        <invoke name= "D"/>
                    </case>
                </switch>
                <switch>
                    <case cond = "(CD & DB) or CB"/>
                        <invoke name= "B"/>
                    </case>
                </switch>
            </sequence>
        </while>
    </sequence>
</while>
</sequence>
</process>
```

Figure 11:
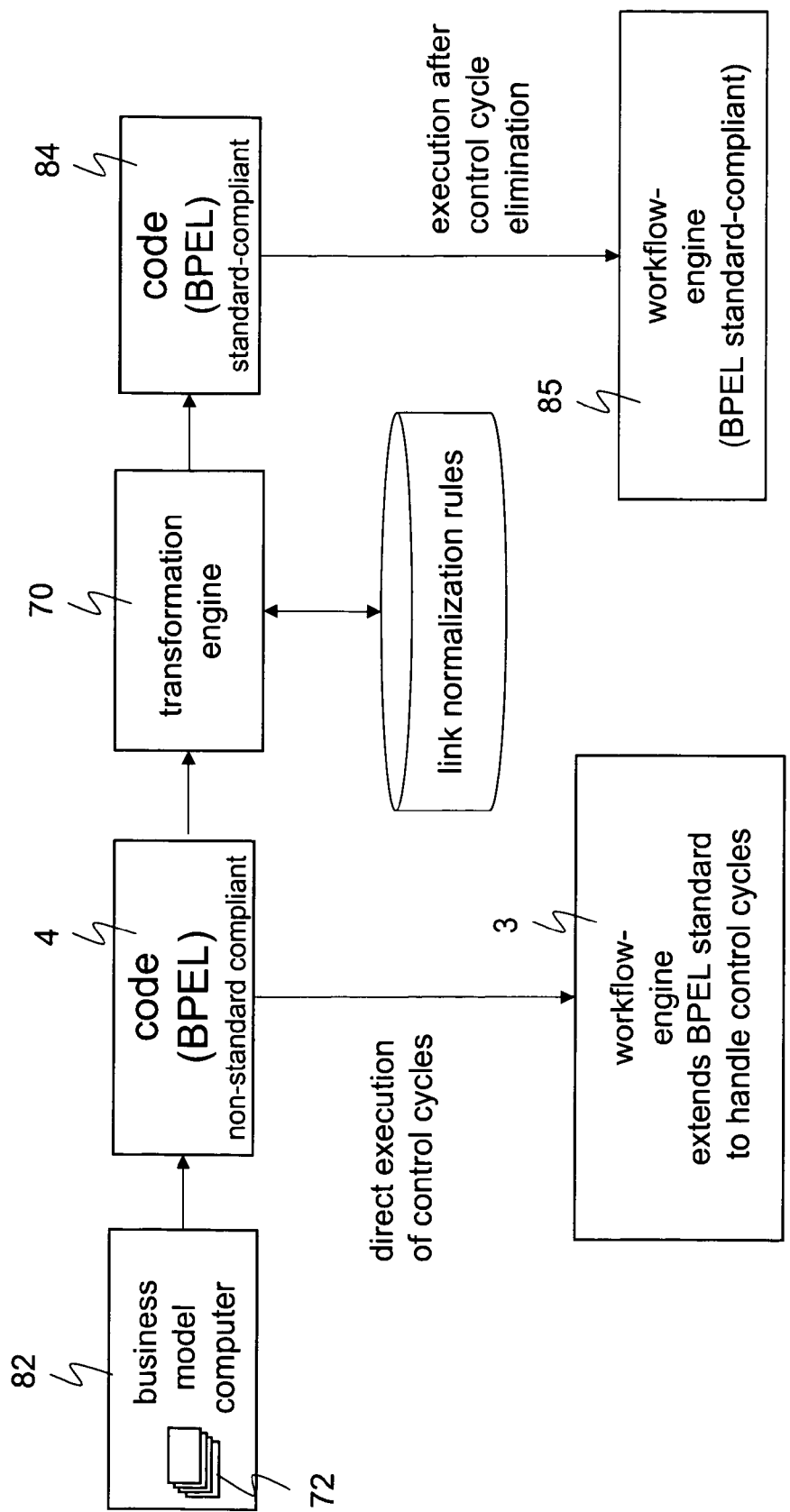

In FIG. 11 a block diagram of the system architecture for the method for generating a BPEL standard compatible workflow code which has been explained above under section "A. Normalizing cyclic links" and the method for executing any workflow code which is explained under section "B. Executing cyclic flows" is illustrated. A computing device 82 generates a workflow code 4, e.g. in BPEL, from an arbitrary process/business model and makes it available for either a transformation engine 70 or an extended workflow engine 3.

If the method for generating a BPEL standard compatible workflow code shall be used and the workflow code 4 comprises cycles which are not allowed in the BPEL standard, it is transformed by the transformation engine 70 with the help of a set of link normalization rules in a BPEL compatible workflow code 84 as described above under section A and made available for a standard workflow engine 85.

If the method for executing any workflow code which is explained under section "B. Executing cyclic flows" shall be used, the workflow code 4 is provided to the extended workflow engine 3 and can directly be executed there.

B. Executing Cyclic Flows

In the following an alternative method is described which uses a modified version of the standard BPEL execution engine which is able to execute workflow models with control cycles caused by links.

The continuation variables x1 to x8 that have been assigned to the graphical model as shown in FIG. 2 and 3 and then were encoded in BPEL4WS as described in sections 3.1 to 3.7 provide the basis for the definition of a workflow engine. The method of encoding produces BPEL4WS workflows containing a single flow activity, in which empty and invoke activities are embedded. The order of execution is determined by the link elements that are added to the BPEL4WS workflow. Each link describes a conditional transition from a source activity to a target activity. The condition can be omitted if it has the value true. The workflow engine executes this set of transitions in a step by step manner. In each step, the set of executable activities is determined. Then one executable activity is selected at random and its effect is applied to update the state of the thread that contains the activity.

Figure 12:
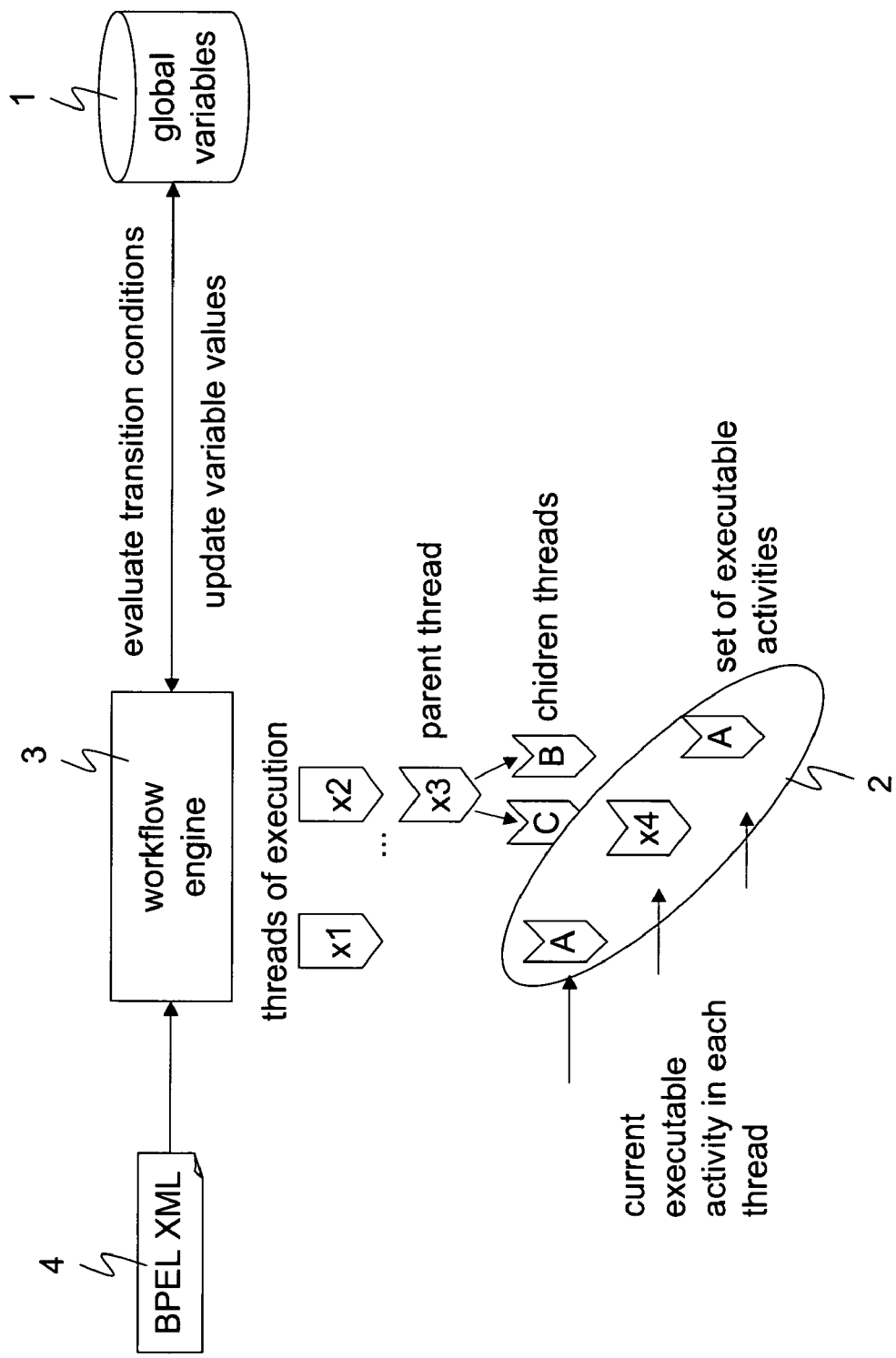

FIG. 12 shows the system architecture comprising the extended workflow engine. The workflow engine 3 receives a BPEL4WS workflow 4 as illustrated in FIG. 3, wherein it is unimportant whether the workflow 4 comprises cycles or not. The state of the workflow 4 is determined by the values of variables defined in the <variables> XML element and which are stored in a variable memory 1. It is assumed that all variables are global, i.e. they can in principle be modified by any activity in the workflow. In the description of the example, these global variables have not been shown explicitly, because they are not needed to explain the method for executing the workflow code.

Initial Setup of the Engine:

The engine determines the empty activities that are not a target of any link. In the example of FIG. 3 this is the empty activity x1. If no such empty activity can be found, the execution is abandoned with an error. Otherwise, a thread of execution is set up for each such empty activity and this empty activity is marked as executable. All variables have their default initial value as it is defined by the BPEL4WS language and since the variables are global, they are shared by all threads. The state of each thread is defined by the value of all variables and the activity that is marked as executable.

Execution of Executable Activities:

The engine selects at random an executable activity from the set of all executable activities from all threads. This activity is executed, i.e. its effect is applied to update the state of the thread that contains the activity and it is deleted from the set of executable activities. For each type of activity in BPEL4WS, its effect must be defined separately. The BPEL4WS workflows that are obtained from the encoding described above, only contain empty and invoke activities, for which the effect is defined as follows: the empty activity has no effect, i.e. it does not change the value of any variable, the invoke activity however changes the value of the variable that it defines in its outputVariable attribute.

After the values of affected variables have been updated, the links are examined that have their source in the executed variable. The transition condition of a link is evaluated over the current state of the variables. If the transition condition evaluates to true, the target activity of this link is added to the set of executable activities. If more than one link has a satisfied transition condition, a new thread for each link is created. Any newly created thread becomes the child of the thread that contained the source activity that lead to the first executable activity in this thread. The target activity is the executable activity of this new thread.

Termination of Execution:

The engine terminates the execution of a workflow if the set of executable activities becomes empty. The execution of the workflow terminates in a valid end state if the last activity of execution in each thread was an activity that is not the source of any link. Otherwise, the execution terminates in an invalid end state. Threads that have no executable activities and no children threads are terminated.

In the following the execution of the workflow of the example shown in FIG. 3 is described. In the example, only the empty activity x1 satisfies the condition that it is not the target of any link. This means, only a single thread is started and the empty activity x1 is marked as executable in this thread. The workflow engine of FIG. 11 follows the single link from the empty activity x1 and executes the "Start" activity, which may affect the value of variables stored in a variable memory 1. Then it executes the empty activity x2, followed by the activity A, then followed by empty activity x3. The empty activity x3 is the source of two links that carry transition conditions. These transition conditions are evaluated over the current state of the variables. If both transition conditions are both satisfied, two new threads, called children threads, are generated and both empty activities x4 and x5 become executable. Otherwise, only a single thread remains in which either no activity is marked executable or either empty activity x4 or x5 is executable. If no activity can be added to the set of executable activities 2, the set 2 becomes empty because the empty activity x3 as its only element was deleted. With that the workflow engine would terminate in an invalid end state, because the empty activity x3 is the source of two links. The only thread of execution would also be terminated. If both empty activities x4 and x5 are added as executable, two new threads are opened, which share the same global set of variables. One of the empty activities x4 or x5 would be randomly selected for execution and so on until either the "End" activity is executed as the last executable activity in each thread and the workflow engine terminates in a valid end state or an invalid end state is reached. In the example, it can happen that the execution continues forever, which happens when neither the DEnd transition condition nor the CEnd transition condition are not satisfied when evaluated in some running thread.

Revisiting an activity in a cycle poses no problem. The activity is simply added to the set of executable activities 2 and becomes the executable activity of the thread that revisits the cycle. The activity will then randomly be selected for execution in a future step. Since the state of a thread is uniquely defined by the value of all variables, the truth of a transition condition and the effect of an executed activity can always be uniquely determined.

The random selection of a single activity for execution at each step resolves possible deadlocks between the various threads. A deadlock would occur if two threads would try to execute their next activity in parallel and these two activities would try to modify the value of the same variable. In a truly parallel mode of execution, such a deadlock could be detected and then the described interleaved execution of threads as described here can be applied.

The invention claimed is:

1. A method for generating a BPEL4WS (Business Process Execution Language for Web Services) executable workflow code from an unstructured cyclic business process model, said method comprising:
   inputting a graphic representation of said business process model using a graphical modeling language,
      wherein said graphical representation comprises:
         activties;
         decisions; and
         an unstructured cycle including more than one entry or more than one exit to an activity or a decision;
   assigning a continuation semantics to said graphical representation, said assigning comprising:
      partitioning said activities and said decisions of said graphical representation into past, present, and future;
      assigning a continuation variable to a start and an end of said graphical representation; and
      assigning a continuation variable to each activity and each decision that has more than one incoming link or ore than one outgoing link;
   encoding said continuation semantics of said graphical representation as a preliminary workflow code of a BPEL4WS process in a computational tree, said encoding comprising:
      linking successive activities and their assigned continuation variables, and encoding said linking as additions to said BPEL4WS process in said computational tree;
      for a decision that branches to first and a second activity, linking said continuation variable assigned to said decision to said continuation variables assigned to said first and second activities, attributing a transition condition to each of said branches, and encoding said linking as additions to said BPEL4WS process in said computational tree; and
      for a decision that branches to a third activity, which is not assigned a continuation variable, adding BPEL4WS process invoke and linking said BPEL4WS process invoke to a successive continuation variable, which is added to said computational tree;
   normalizing cyclic links to form a non-cyclic graph of a BPEL4WS workflow code, corresponding to said preliminary workflow code; said normalizing comprising any of:
      link elimination to eliminate empty activities and redefine links that reference empty activities;
      link merging to replace links to the same empty activity with a single link that recombines transition conditions of replaced links; and
      introducing a "while" activity to eliminate links that create cycles; and
   outputting said BPEL4WS workflow code to a BPEL engine for execution.

2. The method according to claim 1, wherein the unstructured cycle in the preliminary workflow code is replaced by a while-loop.

3. The method according to claim 1, wherein the continuation semantics is encoded in the preliminary workflow code comprising activities which are linked by means of links.

4. The method according to claim 1, wherein the continuation variables are transformed into empty activities.

5. The method according to claim 4, wherein an empty activity is eliminated in the preliminary workflow code and links referring to said empty activity are redefined, if the empty activity occurs only once as target of a link.

6. The method according to claim 4, wherein links to the same empty activity are replaced in the preliminary workflow code by a single link that recombines transition conditions of the replaced links.

7. A computing device for generating a BPEL4WS (Business Process Execution Language for Web Services) executable workflow code from an unstructured cyclic business process model, said computing device comprising:
   a processor that:
   receives a graphical representation of said business process model via inputs to said processor, said graphical representation using a graphical modeling language,
      wherein said graphical representation comprises:
         activities;
         decisions; and
         an structured cycle including more than one entry or more than one exit to an activity or a decision
   assigns a continuation semantics to said graphical representation, said assigning comprising:
      partitioning said activities and said decisions of said graphical representation into past, present, and future;
      assigning a continuation variable to a start and an end of said graphical representation; and
      assigning continuation variable to each activity and each decision that has more than one incoming link or more than one outgoing link;
   encodes said continuation semantics of said graphical representation as a preliminary workflow code of a BPEL4WS process, said encoding comprising:

linking successive activities and their assigned continuation variables, and encoding said linking as additions to said BPEL4WS process in said computational tree;

for a decision that branches to first and a second activity, linking said continuation variable assigned to said decision to said continuation variables assigned to said first and second activities, attributing a transition condition to each of said branches, and encoding said linking as additions to said BPEL4WS process in said computational tree; and for a decision that branches to a third activity, which is not assigned a continuation variable, adding a BPEL4WS process invoke and linking said BPFL4WS process invoke to a successive continuation variable, which is added to said computational tree; and a transformation engine that transforms the preliminary workflow code into a non-cyclic BPEL4WS executable workflow code, wherein said transformation engine normalizes cyclic links to from a non-cyclic graph of a BPEL4WS workflow code, corresponding to said preliminary workflow code, said normalizing comprising any of link elimination to eliminate empty activities and redefine links that reference empty activities;

link merging to replace links to the same empty activity with a single link that recombines transition conditions of replaced links; and introducing a "while" activity to eliminate links that create cycles.

8. The computing device according to claim 7, further comprising a workflow engine for executing the non-cyclic BPEL4WS executable workflow code.

* * * * *